Patented Sept. 16, 1941

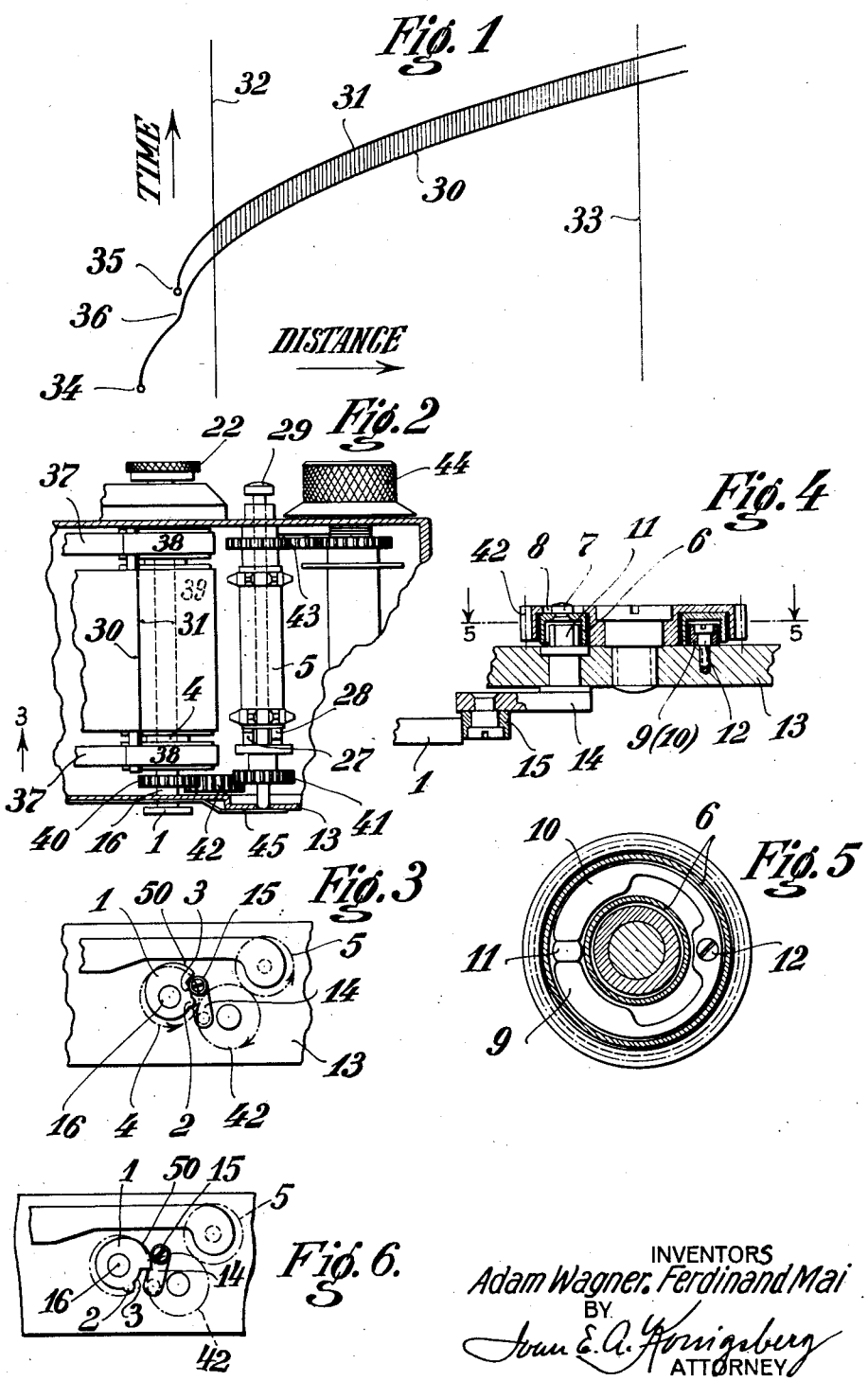

2,256,226

UNITED STATES PATENT OFFICE 2,256,226

FOCAL PLANE SHUTTER

Adam Wagner and Ferdinand Mai, Wetzlar, Germany, assignors, by mesne assignments, to Frank Dumur, Lausanne, Switzerland Application May 16, 1939, Serial No. 273,903
In Germany June 2, 1938

3 Claims. (Cl. 95—57)

This invention relates to improvements in focal plane shutter mechanisms of the type disclosed in the U. S. Patent 2,192,500 dated March 5, 1940, and in the pending application filed by T. Pauschert on May 16, 1939, Ser. No. 273,828. The said applications and this application relate to curtain shutter mechanisms for photographic cameras in which the two shutter curtains move across the film window independently of each other. When such a shutter is rewound after an exposure the edges of the curtains overlap. It follows that, when the shutter is released, the leading curtain edge moves through a greater distance than the edge of the follow up curtain before the edges enter the film window area. Consequently the two edges have different speeds. This causes uneven exposures and also result in certain mechanical disadvantages which must be overcome and compensated for.

The object of the present invention is to provide a simplified construction whereby to obtain a braking effect upon the first curtain so that it will enter the film window area at the same speed as that of the second curtain, and whereby the disadvantages resulting from the overlapping of the edges are eliminated.

Another object of the invention is to provide means for dampening the blow which may and often does occur at the end of the opening movement of the first curtain. This blow or noise is disturbing and it may cause vibrations even during the exposure. The invention is embodied in a braking device built into one of the gears which rotate when the shutter is released. In the accompanying drawing illustrating the invention Fig. 1 is a curve diagram illustrating the operation of the shutter curtains.

Fig. 2 is a view, partly in section and partly broken away, of so much of the camera mechanism as is necessary to understand the invention.

Fig. 3 is a detail view of parts shown in Fig. 2 looking in the direction of the arrow 3.

Fig. 4 is an enlarged detail view of the braking device.

Fig. 5 is a sectional view on the line 5—5 of Fig. 4.

Fig. 6 is a view similar to Fig. 3 but shows the brake lever in position after an exposure and before the shutter is rewound.

The diagram in Fig. 1 illustrates the movements of the shutter curtains. The leading or first curtain is marked 30, the follow up or second curtain is marked 31. The numerals 32 and 33 indicate the edges of the film window within which the exposure takes place. The movement of the leading edges across the film window is designated "distance" and the time of exposure is marked "time." The numeral 34 indicates the starting point of the first curtain and the numeral 35 that of the second curtain. It will be noted that the distance 34—32 is the length of movement of the leading edge of the first curtain to the edge of the film window and the lesser distance 35—32 is the length of movement of the leading edge of the second curtain. By leading edges or simply curtains edges are meant the edges of the curtains which form the exposure opening or slit.

The diagram illustrates the movements of the curtains edges according to this invention in which the overlapping of the edges is eliminated. The numeral 36 indicates the point at which the movement of the first curtain is braked and the speed thereof decreased to an extent corresponding to the starting speed of the second curtain before the two curtains enter the film window area. At 32 the two curtains enter this area at the same speed. They have at that point the same velocity. Thus even exposure of all the portions of the exposed film is assured. Where focal plane shutter curtains move at uneven speeds within the film window uneven exposures result. The shaded area in Fig. 1 indicates the exposure opening formed by the two curtains. In the illustration it happens to indicate a curtain opening of constant width but this is merely the result of the particular exposure selected for convenient illustration. The present invention is directed to shutter curtains which are independently released and which therefore move independently of each other. The question of a constant exposure opening is not involved. For instance, when the shutter is set for time exposure the first curtain moves across the film window at its own speed so that the entire area is exposed before the second curtain starts to move. Also in this case it is desirable that the curtains edges move at the same speed to avoid uneven exposures.

Referring now to Fig. 2 the shutter mechanism comprises the first curtain 30 which is connected by ribbons 37, 37 to ribbon reels 38, 38. The second curtain is connected to the curtain roller 39. The curtain roller shaft 16 carries said ribbon reels 38 and is connected by gears 40, 42 and 41 to the film transport roller 5. The latter is operated by a train of gears 43 actuated by the rewinding knob 44. The gears 40, 42 and 41 are coupled to the roller 5 by a clutch 27, 28. When the usual shutter release 29 is depressed the clutch is thrown out and the shutter curtains are drawn across the film window to make an exposure. Each curtain is operated by its own spring roller. These rollers are not shown being well known. The movements of the curtains are from the right in Fig. 2. After an exposure the shutter is rewound by rotating the rewinding knob 44, the clutch 27—28 being thrown in by the spring 45. Seen from above in Fig. 2 the shaft 16 moves clockwise when the shutter is released. In Fig. 3 the shaft 16 moves anticlockwise when the shutter is released. The construction and operation of a focal plane shutter as herein briefly outlined is well known in the art and fully disclosed in the said two pending applications.

Referring now to Figs. 3, 4 and 5 the curtain shaft 16 carries at its lower end a disk 1 which is formed with a tooth 2 and a recessed portion 3 behind a high cam portion 50. Within the gear 42 there is a braking device consisting of a brake lining 6 in the form of an annular hollow dish as shown. The lining 6 carries a pin 7 which extends into a cut out 8 in the gear so that the lining is circularly movable within the gear as will be explained hereafter. Two brake shoes 9 and 10 are attached to a partition 13 of the camera by a screw 12. The shoes are adapted to be pressed outward against the brake lining by means of a cam 11 pivoted in the partition 13. Below the latter the cam 11 carries a lever 14 having a cam roller 15 which engages the disk 1 as seen in Fig. 3.

When the shutter is rewound and closed the parts are in the positions shown in Fig. 3. When an exposure is to be made, the shutter release 29 is depressed, the shaft 16 is rotated anticlockwise in Fig. 3 and the shutter is opened. The tooth 2 on the disk 1 then swings the brake lever 14 to the right in Fig. 3 thereby causing the brake to be applied by rotation of the cam 11, sufficient to decrease the velocity of the first curtain so that it thereafter, from the point 36 in Fig. 1, will move with the same speed as that of the second curtain and both curtains will enter the film window area at the same speed. Near the end of the movement of the first curtain, i. e. the end of the anticlockwise rotation of the shaft 16, the high cam portion 50 engages the cam roller 15 and swings the lever 14 so far inward that the brake cam 11 is again and further actuated to apply the brake as will be understood and the first curtain stops, the cam roller 15 then coming to rest in the recess 3 and the brake is released.

The aforesaid relative movement between the brake lining 6 and the gear 42 is provided to prevent locking of the brake when the curtains are released and have run down. At this time the shaft 16 stops before it has made a complete revolution and the parts are then in the position shown in Fig. 6 and the brake is set. When the shutter is to be rewound the gear 42 must be free to rotate or the rewinding operation cannot follow immediately, or at least force must be used to overcome the resistance of the brake. However, when the rewind begins the gear 42 is free to rotate relative to the brake lining as aforesaid, and this relative movement is sufficient to release the brake. This relative movement takes place only on the rewinding operation.

The braking device therefore operates to accomplish a twofold purpose. First the speed of the first curtain is decreased or braked to an extent to equalize the starting speed of the second curtain. Secondly, the brake is applied more strongly at the end of the opening movement of the first curtain to prevent jar and shock. Thereafter the brake is released and the shutter may now be rewound.

We claim:

1. In a braking device for a focal plane shutter which includes a leading and a follow up curtain which are released successively to form an exposure opening and which curtains move with accelerated motion when released, a mechanism for decreasing the speed of the leading curtain so that both of said curtains may enter the exposure area at the same speed after their release and for again decreasing the speed of said leading curtain at the end of its movement to avoid jar and noise, said mechanism consisting of a brake, brake actuating means interposed between said brake and said leading curtain and operatively connected to both for automatically operating said brake when said leading curtain is released and just before an exposure and for again automatically operating said brake after an exposure for the purposes aforesaid.

2. A brake mechanism according to claim 1 comprising an expanding brake, a brake lever for actuating the same, a rotatable cam disk operatively connected to the leading curtain of the shutter, means on said disk for operating said lever automatically just before and after an exposure to actuate the brake for the purpose set forth and means for rotating said cam disk.

3. A brake mechanism according to claim 1 including a brake housing, a brake lining and means for mounting said lining within said housing in relative rotatable relation whereby to facilitate releasing said brake after it has been operated.

ADAM WAGNER.
FERDINAND MAI.